US007292566B2

United States Patent
Takahashi (10) Patent No.: US 7,292,566 B2
(45) Date of Patent: Nov. 6, 2007

(54) TELEPHONE TERMINAL AND STORAGE MEDIUM STORING TERMINAL CONTROL PROGRAM THEREOF

(75) Inventor: Hideaki Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 948 days.

(21) Appl. No.: 10/670,402

(22) Filed: Sep. 26, 2003

(65) Prior Publication Data

US 2004/0076146 A1    Apr. 22, 2004

(30) Foreign Application Priority Data

Sep. 30, 2002    (JP)    ............................. 2002-285735

(51) Int. Cl.
*H04L 12/66*    (2006.01)
*H04L 12/28*    (2006.01)
(52) U.S. Cl. ...................................... 370/352; 370/392
(58) Field of Classification Search ................ 370/352, 370/392
See application file for complete search history.

(56) References Cited

FOREIGN PATENT DOCUMENTS

| JP | A 2-90846 | 3/1990 |
|---|---|---|
| JP | A 3-174894 | 7/1991 |
| JP | A 3-232351 | 10/1991 |
| JP | A 6-268578 | 9/1994 |
| JP | A 7-95283 | 4/1995 |
| JP | A 2001-203802 | 7/2001 |

*Primary Examiner*—Rasha S. Al-Aubaidi
(74) *Attorney, Agent, or Firm*—Oliff & Berridge, PLC (57) ABSTRACT

A telephone terminal provided with a plurality of transmitter/receiver units and a base unit. When receiving an incoming call based on identifying information through Internet, the telephone terminal calls the transmitter/receiver unit to perform a voice call only if the voice call through the transmitter/receiver unit of the identifying information is available. When receiving the incoming call based on IP address through Internet network, the telephone terminal determines whether or not the voice call through the transmitter/receiver unit, to which identifying information is assigned, is available. Only if the voice call is available, the transmitter/receiver is called and the voice call is performed with a calling party through Internet network. If the voice call is unavailable, the message indicating that the voice call is unavailable is output to the calling party.

11 Claims, 7 Drawing Sheets

| IP ADDRESS | TRANSMITTER/RECEIVER |
|---|---|
| IP address—0 | HANDSET |
| IP address—1 | FIRST HANDSET TERMINAL |
| IP address—2 | SECOND HANDSET TERMINAL |
| IP address—3 | THIRD HANDSET TERMINAL |

TELEPHONE TERMINAL AND STORAGE MEDIUM STORING TERMINAL CONTROL PROGRAM THEREOF

BACKGROUND OF THE INVENTION

1. Field of the Invention

The present invention relates to a telephone terminal and a terminal control program to perform a voice call through Internet by inputting/outputting audio based on audio signals transmitted through Internet from a transmitter/receiver.

2. Background Art

These days various technologies to perform a voice call through Internet are proposed; therefore, a telephone terminal which performs a voice call through Internet is developed and becomes common. An example of the technology to perform a voice call through Internet is an Internet extension telephone as disclosed in the Publication of Japanese Unexamined Patent Application 2001-203802, in which a plurality of terminals having an Internet call function (a function to accomplish a voice call through Internet) is connected by a communication line and one of these terminals is set to be as a base unit and the others as portable handsets.

In the aforementioned Internet extension telephone, when a terminal of either a base unit or a portable handset receives an incoming call, all terminals are configured to be called. Even terminals other than the one which has received an incoming call can respond to the incoming call, with a result that the terminal received an incoming call can not always perform a voice call with a calling party (called party). Therefore, there is such an effect that users of other terminals can perform a voice call when the user of the terminal received an incoming call is absent. On the other hand, for example, there is such a problem that the incoming call from a calling party to a specific terminal is connected to other terminals.

In order to solve the aforementioned problem, an object of the present invention is to provide the technology to perform the voice call between the terminal received an incoming call and a calling party without fail when an incoming call is received through Internet.

SUMMARY OF THE INVENTION

The above and other objects are attained by a telephone terminal having a plurality of transmitter/receiver units, to each of which identifying information on Internet is assigned, and a base unit for inputting/outputting audio signals transmitted through Internet to relay the audio signals to the transmitter/receiver unit, wherein the base unit comprises: an inquiry device that inquires the state of use to the transmitter/receiver unit, to which the identifying information is assigned, when the incoming call based on the identifying information through Internet is received; a determination device that determines whether or not the voice call through the transmitter/receiver unit is available based on the state of use responded to the inquiry by the inquiry device; and a call response device (i) that calls the transmitter/receiver unit to perform a voice call with a calling party through Internet, when the determination device determines that the voice call through the transmitter/receiver unit is available, (ii) that outputs the message to the calling party so as to notify that the voice call is unavailable, when the determination device determines that the voice call is unavailable; and wherein the transmitter/receiver unit comprises: a notification device that notifies the state of use of the transmitter/receiver unit to the base unit when receiving the inquiry of the sate of use from the base unit.

According to the telephone terminal configured as above, the determination device determines whether or not the voice call through the transmitter/receiver unit, to which the identifying information is assigned, is available when receiving the incoming call based on identifying information through Internet. Such processes are executed by the call response device that the transmitter/receiver unit is called to perform a voice call with a calling party through Internet (called party) when the determination result reveals that the voice call through the transmitter/receiver unit is available, while the message indicating that the voice call is unavailable is output to the calling party when the determination result reveals that the voice call is unavailable. Thus, a voice call is ensured to be performed between the transmitter/receiver unit (terminal) received an incoming call, and a calling party, when receiving the incoming call through Internet.

Also, when the incoming call based on identifying information is received through Internet, the determination device determines whether or not the voice call through the transmitter/receiver unit of the identifying information is available. Only if the determination result reveals that the voice call is available, the call response device calls the transmitter/receiver unit.

Furthermore, when the determination device determines that the voice call is unavailable, the call response device outputs the message indicating that the voice call is unavailable so as to notify to the user of a calling party. Meanwhile, the aforementioned "identifying information on Internet" here means information for identifying devices, data positions, and coordinates which exist on Internet (URI: Uniform Resource Identifiers).

The inquiry device of the base unit is for inquiring the state of use to the transmitter/receiver unit; for example, the inquiry device may output control signals for requesting the notification of the state of use, thereby performing the inquiry. Also, the notification device of the transmitter/receiver unit is for notifying the state of use of the transmitter/receiver unit itself to the base unit; for example, when receiving the inquiry of the state of use from the base unit, the notification device may output control signals indicating the state of use of the transmitter/receiver unit itself to the base unit so as to notify.

Also, the determination device of the base unit is for determining whether or not the voice call through the transmitter/receiver unit is available; for example, the determination device may determine whether or not the voice call is available based on whether or not the voice call through the transmitter/receiver unit is in progress. More specifically, the transmitter/receiver unit may notify by the notification device that the voice call through the transmitter/receiver unit is in progress when the voice call is in progress through Internet, while may notify that the voice call through the transmitter/receiver unit is not in progress when the voice call is not in progress, in receiving the inquiry of the state of use from the base unit. And the base unit may determine by the determination device that the voice call through the transmitter/receiver unit is unavailable when the transmitter/receiver unit notifies that the voice call is in progress, while may determine that the voice call is available when the transmitter/receiver notifies that the voice call is not in progress.

According to the telephone terminal configured as above, when receiving the inquiry of the state of use from the base unit, the transmitter/receiver unit notifies by the notification device that the voice call is in progress when the voice call through the transmitter/receiver unit itself is in progress through Internet, while notifies that the voice call is not in progress when the voice call is not in progress. And the base unit determines by the determination device that the voice call through the transmitter/receiver unit is unavailable when being notified by the transmitter/receiver unit that the voice call is in progress, while determines that the voice call is available when being notified that the voice call is not in progress. Thus, it is determined whether or not a voice call is available based on whether or not the voice call through the transmitter/receiver unit is in progress.

Also, the determination device of the base unit may set a state, in which each of the transmitter/receiver units is capable or incapable of response to an incoming call, thereby determining whether or not a voice call is available on the basis of the setting state. More specifically, the transmitter/receiver unit (i) includes such a setting device that the transmitter/receiver unit can set a state capable/incapable of response to an incoming call, according to a user's operation, and (ii) notifies by the notification device that the transmitter/receiver unit is incapable of response if being set in the state incapable of response by the setting device, while notifies that the transmitter/receiver unit is capable of response if being set in the state capable of response by the setting device when receiving the inquiry of the state of use from the base unit. And the base unit determines by the determination device that the voice call through the transmitter/receiver unit is unavailable when being notified that the transmitter/receiver unit is in the sate incapable of response, while determines that the voice call through the transmitter/receiver unit is available when being notified that the transmitter/receiver unit is in the sate capable of response.

According to the telephone terminal configured as above, when receiving the inquiry of the state of use from the base unit, if being set in the state incapable of response, the transmitter/receiver unit notifies by the notification device that the transmitter/receiver unit is incapable of response, while if being set in the state capable of response, the transmitter/receiver notifies that it is capable of response. And the base unit determines by the determination device that the voice call through the transmitter/receiver unit is unavailable if being notified that the transmitter/receiver unit is incapable of response, while determines that the voice call through the transmitter/receiver unit is available if being notified that the transmitter/receiver unit is capable of response. Thus, it is determined whether or not a voice call is available based on the setting state set by the transmitter/receiver unit itself.

More specifically, when receiving the inquiry of the state of use from the base unit, and if being set in the state incapable of response by the setting device, the transmitter/receiver unit may notify as well as output the message by the notification device to the base unit indicating that the transmitter/receiver unit is in the state incapable of response. And if the determination device determines that the voice call through the transmitter/receiver unit is unavailable, the base unit outputs the notification indicating that the transmitter/receiver unit is in the state incapable of response and the message input by the transmitter/receiver as a message so as to notify that the voice call is unavailable to a calling party by the call response device.

According to the telephone terminal configured as above, if being placed to be in the state incapable of response, the transmitter/receiver unit notifies that it is incapable of response, and output the message so as to notify that the transmitter/receiver unit is incapable of response to the base unit by the notification device. If being notified by the transmitter/receiver unit that the transmitter/receiver unit is incapable of response, the base unit determines by the determination device that the voice call through the transmitter/receiver unit is unavailable. And when notifying that the transmitter/receiver unit is in the state incapable of response, the base unit may output the message input by the transmitter/receiver unit as a message so as to notify that the voice call is unavailable to the calling party by the call response device.

According to the configuration as above, different messages are placed for each of the transmitter/receiver units, thereby outputting a different message for every transmitter/receiver unit to a calling party as a message to notify that a voice call is unavailable. Alternatively, the determination device of the base unit determines whether or not a voice call is available based on the setting state of each of the transmitter/receiver units. More specifically, the base unit comprises a setting device for setting individually whether or not each of a plurality of the transmitter/receiver units is capable of response to an incoming call according to a user's operation. And when the incoming call based on the identifying information is received through Internet, the determination device determines that the voice call through the transmitter/receiver unit is unavailable if the transmitter/receiver unit, to which the identifying information is assigned, is set to be in the state incapable of response, while determines that the voice call is available if the transmitter/receiver unit is set to be in the state capable of response.

According to the telephone terminal configured as above, when the incoming call based on the identifying information is received through Internet, the determination device determines that the voice call through the transmitter/receiver unit is unavailable if the transmitter/receiver unit, to which the identifying information is assigned, is set to be in the state incapable of response, while determines that the voice call through the transmitter/receiver unit is available if the transmitter/receiver unit is set to be in the state capable of response. Thus, it is determined whether or not a voice call is available on the basis of the setting state of the transmitter/receiver unit set by the base unit. Particularly in this configuration, the setting state of a plurality of the transmitter/receiver units may be set intensively by the base unit.

Also, in the telephone terminal, the base unit includes a voice recording device capable of recording audio signals, and a recording command device to make the voice recording device record audio signals input by the calling party after the call response device outputs a message to a calling party.

According to the telephone terminal configured as above, after the call response device outputs a message to a calling party, the recording command device makes the voice recording device record audio signals input by the calling party. Thus, when the voice call through the transmitter/receiver unit is unavailable, the voice recording device records the message which has input as audio signals by a calling party, thereby accomplishing an answering phone function.

Also, when not receiving a response to the inquiry by the inquiry device, the base unit determines by the determination device that the voice call through the transmitter/receiver unit is unavailable.

According to the telephone terminal configured as above, when the transmitter/receiver unit does not respond to the inquiry by the inquiry device, the determination device determines that the voice call through the transmitter/receiver unit is unavailable. Therefore, if the transmitter/receiver unit can not respond to an inquiry because of the following reasons: (i) the transmitter/receiver unit breaks down, (ii) the transmitter/receiver unit is a handset terminal for wireless communication and a remaining battery capacity for driving the handset terminal decreases, or (iii) receiving level of the electric wave transmitted by the handset terminal is below a threshold (that is, outside the service area) when using wireless communication, it is determined that the voice call through the transmitter/receiver unit is unavailable.

Also, a telephone terminal has a plurality of transmitter/receiver units, to each of which identifying information on Internet is assigned, and a base unit for inputting/outputting audio signals transmitted through Internet to relay the audio signals to the transmitter/receiver unit, wherein the base unit comprises: an inquiry device that inquires the state of use to the transmitter/receiver unit, to which the identifying information is assigned, when the incoming call based on the identifying information is received through Internet; a determination device that determines whether or not the voice call through the transmitter/receiver unit is available based on the state of use responded to the inquiry by the inquiry device; and a call response device that calls only the transmitter/receiver unit to perform a voice call with a calling party through Internet, when the determination device determines that the voice call through the transmitter/receiver unit is available; and wherein the transmitter/receiver unit comprises: a notification device that notifies the state of use of the transmitter/receiver unit to the base unit when receiving the inquiry of the sate of use from the base unit.

According to the telephone terminal configured as above, when the incoming call based on the identifying information is received through Internet, the determination device determines whether or not the voice call through the transmitter/receiver unit, to which the identifying information is assigned, is available. If the determination result reveals that the voice call through the transmitter/receiver unit is available, the call response device executes a process to call the transmitter/receiver unit to perform the voice call with the calling party (called party) through Internet. Thus, when an incoming call is received through Internet, a voice call to the incoming call is ensured to be performed between the transmitter/receiver unit (terminal) received the incoming call, and a calling party.

Also, when the incoming call based on the identifying information is received through Internet, the determination device determines whether or not the voice call through the transmitter/receiver unit of the identifying information is available. Only if the determination result reveals that the voice call is available, the call response device calls the transmitter/receiver unit.

Also, a terminal control program is a program to make a computer system execute a variety of processes for controlling a telephone terminal comprising a plurality of transmitter/receiver units, to each of which the identifying information on Internet is assigned, and a base unit for inputting/outputting audio signals transmitted through Internet to relay the audio signals to the transmitter/receiver unit. The terminal control program includes a determination process to determine whether or not the voice call through the transmitter/receiver unit is available based on the state of use of the transmitter/receiver unit, to which the identifying information is assigned, when receiving the incoming call based on the identifying information, and a call response process to call the transmitter/receiver unit to perform the voice call with the calling party through Internet when the determination process determines that the voice call through the transmitter/receiver unit is available; on the other hand, to output the message so as to notify that the voice call is unavailable to the calling party when the determination process determines that the voice call is unavailable.

Also, in the determination process, the terminal control program may be a program to determine whether or not a voice call through the transmitter/receiver unit is available.

Also, the terminal control program may be a program including a setting procedure to make a user set whether or not the transmitter/receiver unit is capable of response to an incoming call. And in the determination procedure, the terminal control program may be a program such that the transmitter/receiver unit determines whether or not a voice call is available.

Also, the terminal control program may be a program to make a computer system execute a variety of processes for controlling a telephone terminal including a voice recording device capable of recording audio signals in the base unit, and may be a program including a recording command procedure to make the voice recording device record audio signals.

Also, in the determination process, the terminal control program may a program such that the transmitter/receiver unit determines whether or not a voice call is unavailable.

Also, the terminal control program is a program to make a computer system execute a variety of processes for controlling a telephone terminal comprising a plurality of transmitter/receiver units, to each of which the identifying information on Internet is assigned, and a base unit for inputting/outputting audio signals transmitted through Internet to relay the audio signals to the transmitter/receiver unit, the terminal control program including a determination process to determine whether or not the voice call through the transmitter/receiver is available based on the state of use of the transmitter/receiver unit, to which the identifying information is assigned; and a call response process to call the transmitter/receiver unit to perform the voice call with the calling party through Internet when the determination process determines that the voice call through the transmitter/receiver unit is available.

Meanwhile, the aforementioned program is provided for a user utilizing a telephone terminal itself, a computer system or the like through recording medium such as FD, CD-ROM, and memory card or through communication network such as Internet. Also, as a computer system to execute the system control program, a computer system comprising a telephone terminal, and a computer system connected to data through a wire or wireless communication path to a telephone terminal may be used.

Also, the communication method using a telephone terminal having a plurality of transmitter/receiver units, to each of which identifying information on Internet is assigned, and a base unit for inputting/outputting audio signals transmitted through Internet to relay the audio signals to the transmitter/receiver unit, comprising the steps of: inquiring the state of use to the transmitter/receiver unit, to which the identifying information is assigned, when the incoming call based on the identifying information is received through Internet; determining whether or not the voice call through the transmitter/receiver unit is available based on the state of use responded to the inquiry; and a process (i) calling the transmitter/receiver unit to perform a voice call with a calling party through Internet, when the determination device determines that the voice call through the transmitter/receiver unit is available, (ii) outputting the message to the calling party so as to notify that the voice call is unavailable, when the determination device determines the voice call is unavailable.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
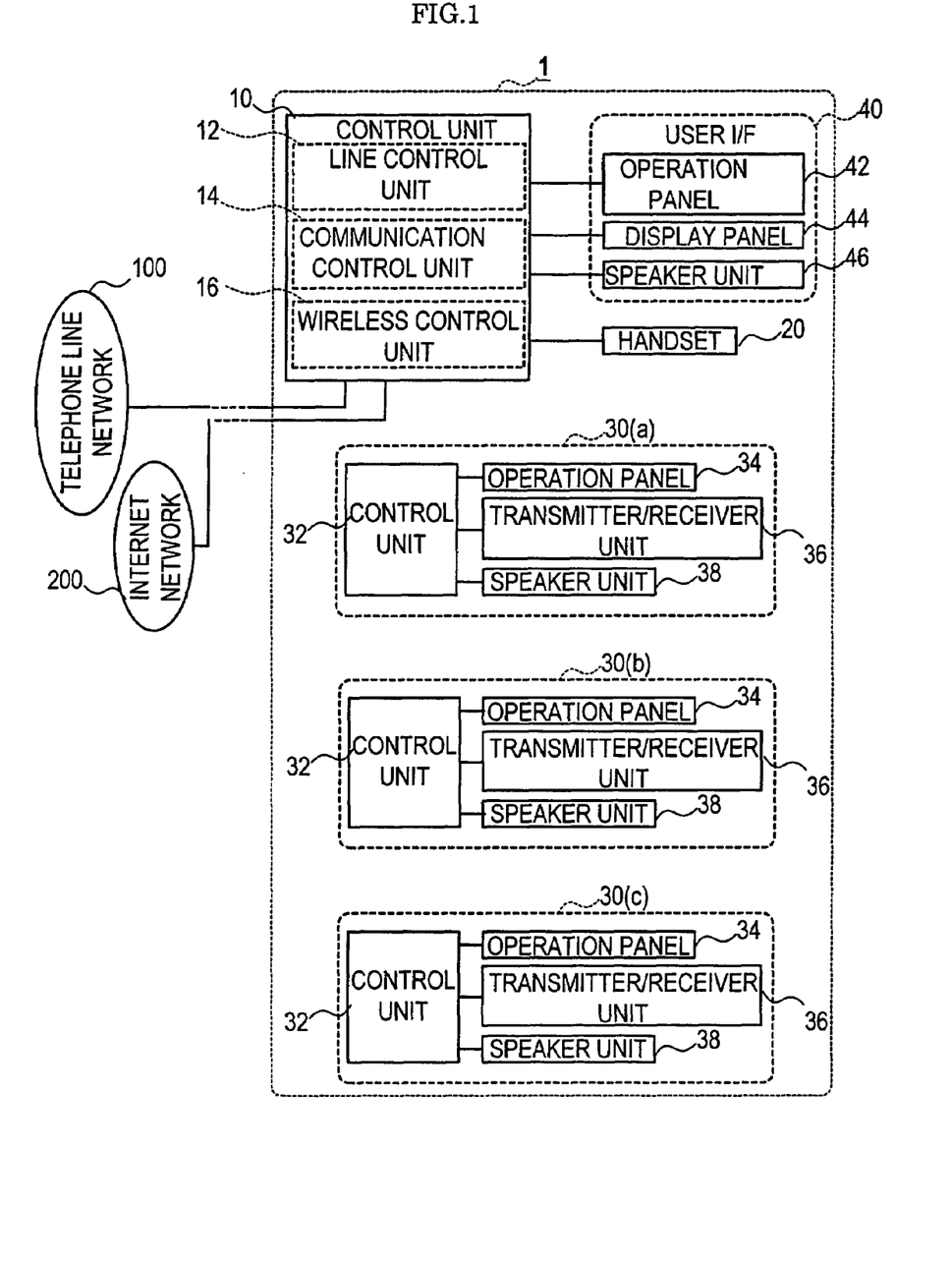
FIG. 1 is a block diagram showing the control system of a telephone terminal according to the embodiment.

As shown in FIG. 1, a telephone terminal 1 is used in the state in which it is connected to a telephone line network 100 and an Internet network 200, and the telephone terminal 1 comprises a control unit 10 for controlling the operation of the entire telephone terminal 1, a handset 20, a handset terminal 30 for a wireless communication and a user interface unit (hereinafter referred to as user I/F) 40.

A control unit 10 comprises a line control unit 12 for inputting/outputting audio signals transmitted through the telephone line network 100, a communication control unit 14 for inputting/outputting packet data (hereinafter referred to as IP packet) transmitted through the Internet network 200, and a wireless control unit 16 for transmitting/receiving the IP packet for various controls among handset terminals 30 through wireless communication.

The control unit 10 outputs audio signals input through the telephone line network 100 to the handset 20. Moreover, the control unit 10 outputs audio signals based on audio, which a user inputs to the handset 20, to the telephone line network 100 by the function of the line control unit 12.

By the function of the communication control unit 14, the control unit 10 generates audio signals based on the IP packet input through the Internet network 200 and outputs the same to the handset 20. Moreover, the control unit 10 generates the IP packet based on audio signals input to the handset 20 and outputs the same to the Internet network 200.

By the function of the line control unit 12 and the communication control unit 14, the control unit 10 generates the IP packet based on audio signals input through the telephone line network 100 and outputs the same to the Internet network 200. Moreover, the control unit 10 generates audio signals based on the IP packet input from the Internet network 200 and outputs the same to the telephone line network 100.

By the function of the line control unit 12 and the wireless control unit 16, the control unit 10 generates the IP packet based on audio signals input through the telephone line network 100 and transmits the same to the handset terminal 30 through wireless communication.

Moreover, the control unit 10 generates audio signals based on the IP packet received from the handset terminal 30 through wireless communication and output the same to the telephone line network 100.

By the function of the communication control unit 14 and the wireless control unit 16, the control unit 10 transmits the IP packet input through the Internet network 200 to the handset terminal 30 through wireless communication. Moreover, the control unit outputs the IP packet received from the handset terminal 30 through wireless communication to the Internet network 200.

A set of handset terminals 30 comprise a first handset terminal 30*a*, a second handset terminal 30*b* and a third handset terminal 30*c*. Each of these terminals includes a control unit 32 for controlling the operation of the entire handset terminal 30, an operation panel 34 having a plurality of key switches, a transmitter/receiver 36 having a microphone/speaker and a drive circuit for driving the speaker, and a speaker unit 38 having a speaker and a driving circuit for driving the speaker. The operation panel 34 has letter keys for imputing characters, numbers and codes, and a mode switch for switching the IP call mode. The "IP call mode" here means a mode to indicate the correspondence of the handset terminal 30 when an incoming call is received through the Internet network 200. By the mode switch, the call mode is switched to a normal mode (off side), which makes calling to perform a voice call, or an absence mode (on side), which uses an answering phone function, when receiving an incoming call.

The handset terminal 30 generates audio signals based on the IP packet received from the base unit of the telephone terminal 1 through wireless communication, and outputs the same to the transmitter/receiver unit 36 by the control unit 32. Moreover, the handset terminal 30 generates the IP packet based on audio signals input to the transmitter/receiver unit 36 and transmits the same to the base unit of the telephone terminal 1 through wireless communication. Also, when the operation panel 34 is operated, the handset terminal 30 transmits the IP packet for various controls indicating the content of the operations to the base unit of the telephone terminal 1 through wireless communication. The control unit 10 of the telephone terminal 1, which has received the IP packet, detects that the operation panel 34 of the handset terminal 30 has been operated and identifies the content of the operations based on the control IP packet.

A user I/F40 comprises an operation panel 42 including a plurality of key switches, a display panel 44 for displaying various information, and a speaker unit 46 including a speaker and a drive circuit for driving the speaker. Among these, the operation panel 42 comprises letter keys for imputing characters, numbers and codes, and a mode switch for switching a call mode. The "call mode" here means a mode to indicate the correspondence both as the entire telephone terminal 1 when an incoming call is received through the telephone line network 100 and as the handset 20 when au incoming call is received through the Internet network 200. By the mode switch, the call mode is switched to a normal mode (off side), which makes calling to perform a voice call, or to an absence mode (on side), which uses an answering phone function, when receiving an incoming call.

Figure 2:
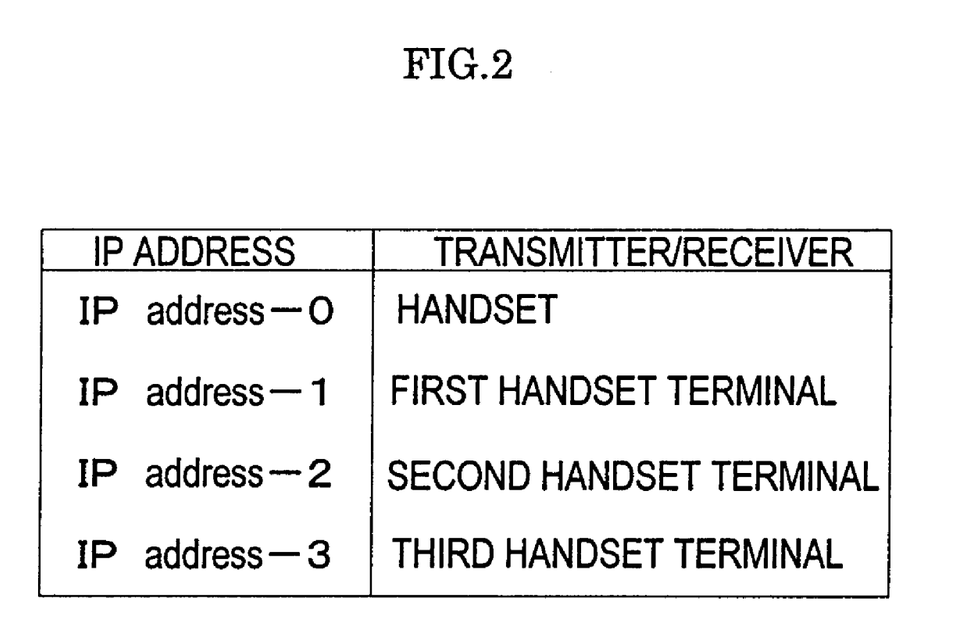
FIG. 2 is a diagram showing a correspondence between a transmitter/receiver and IP address.

The aforementioned handset 20 and each handset terminal 30 work as transmitter/receivers. These transmitters/receivers are provided different IP addresses as shown in FIG. 2.

The Telephone Call Process by the Control Unit 10

The procedure of the telephone call process executed by the control unit 10 will now be described with reference to the FIG. 3. The procedure of the telephone call process is performed when receiving an incoming call from the telephone line network 100.

The control unit 10 first determines whether or not a call mode is in absence mode (s100). In this process, when the mode switch of the operation panel 42 is switched to absence mode (on side), it is determined that the call mode is in absence mode. On the other hand, when it is switched to normal mode (off side), it is determined that the call mode is in absence mode.

In the process of s100, when a call mode is not in absence mode, (s100: NO), it is determined whether or not a voice call through the Internet network 200 by using the handset 20 is in progress (s110). If the voice call is not in progress by using the handset 20 in the process of s110, (s110: NO), the base unit of the telephone terminal 1 starts to call (S120). In this process, the control unit 10 commands the user I/F40 to start outputting a ringing tone and the user I/F40 which has received the command starts outputting the ringing tone.

After the process of s120 is finished, or if the voice call using the handset 20 is in progress in the process of s110 (s110: YES), it is determined whether or not the voice call through Internet network 200 by using the first handset terminal 30a is in progress (s130). In this process, the control unit 10 transmits the control IP packet so as to request for notifying the state of use to the first handset terminal 30a. And the first handset terminal 30a, which has received the IP packet, transmits control IP packet so as to notify that the voice call is/is not in progress if the voice call is/is not in progress through the Internet network 200, respectively. Thereby, it is determined whether or not the voice call through the Internet network 200 by using the first handset terminal 30a is in progress.

If the voice call using the first handset terminal 30a is not in progress in the process of s130, (s130: NO), calling by using the first handset terminal 30a is performed (s140). In this process, the control unit 10 transmits the control IP packet so as to command to start outputting a ringing tone to the first handset terminal 30a, and the first handset terminal 30a which has received the IP packet starts outputting the ringing tone from the speaker unit 38.

After the process of s140 is finished or if the voice call using the first handset terminal 30a is in progress in the process of s130 (s130: YES), it is determined whether or not the voice call through the Internet network 200 by using the second handset terminal 30b is in progress (s150). In this process, like in s130, the control unit 10 transmits the control IP packet to the second handset terminal 30b, and the second handset terminal 30b which has received the IP packet transmits the control IP packet so as to notify that the voice call is/is not in progress if the voice call is/is not in progress, respectively. Thereby, it is determined whether or not the voice call through the Internet network 200 by using the second handset terminal 30b is in progress.

If the voice call using the second handset terminal 30b is in progress in the process of s150 (s150: NO), calling by using the second handset terminal 30b is performed (s140). In this process, the control unit 10 transmits the control IP packet so as to command to start outputting a ringing tone to the second handset terminal 30b, and the second handset terminal 30b which has received the IP packet starts outputting the ringing tone from the speaker unit 38.

After the process of s160 is finished or if the voice call using the second handset terminal 30b is in progress in the process of s150 (s150: YES), it is determined whether or not the voice call through the Internet network 200 by using the third handset terminal 30c is in progress (s170). In this process, like in s130 and s150, the control unit 10 transmits the control IP packet to the third handset terminal 30c, and the third handset terminal 30c transmits the control IP packet so as to notify that the voice call is/is not in progress if the voice call is/is not in progress, respectively. Thereby, it is determined whether or not the voice call through the Internet network 200 by using the third handset terminal 30c is in progress.

If the voice call using the third handset terminal 30c is not in progress in the process of s170, (s170: NO), calling by using the third handset terminal 30c is performed (s180). In this process, the control unit 10 transmits the control IP packet so as to command to start outputting a ringing tone to the third handset terminal 30c, and the third handset terminal 30c which has received the IP packet starts outputting the ringing tone from the speaker unit 38.

After the process of s180 is finished, it is determined whether or not any transmitter/receiver has responded to the calling (s190). In this process, it is determined whether or not the operation (off hook operation) to perform the voice call by using either the handset 20 or each handset terminal 30 has been done.

If any transmitter/receiver has not responded to the calling in the process of s190, (s190: NO), the procedure returns to the process of s110. On the other hand, if any transmitter/receiver has responded to the calling in the process of s190 (s190: YES), the calling which has performed in each of the processes of s120, s140, s160 and s180 is terminated (s200). In this process, the control unit 10 commands the user I/F40 to terminate the output of a ringing tone, and the user I/F40 which has received the command terminates output of the ringing tone. Also, the control unit 10 transmits the control IP packet so as to command to terminate output of the ringing tone to each handset terminal 30, and each handset terminal 30 which have received the IP packet terminates output of the ringing tone.

Then, the voice call is performed between the transmitter/receiver, which has responded to the calling in the process of s190, and the calling party (s210). In this process, a transmission path of audio signals through the telephone line network 100 to the transmitter/receiver which has responded to the calling is established, and the state in which the line between the telephone terminal 1 (the transmitter/receiver thereof) and the calling party is connected is made, thereby performing the voice call.

Then, the control unit 10 waits until the operation to terminate the voice call is conducted (s220: NO). In this process, the control unit 10 waits until the transmitter/receiver which has responded to the calling in the process of s190 conducts the operation (on hook operation) to terminate the voice call. After the operation to terminate the voice call in the process of s220 is conducted (s220: YES), the processing procedure to terminate the voice call is executed (s230). In this process, the transmission path of audio signals to the transmitter/receiver which has responded to the calling from the telephone line network 100 is released, and the state in which the line between the telephone terminal 100 (the transmitter/receiver thereof) and the calling party is disconnected is made, thereby terminating the voice call.

After the process of s230 is finished, the telephone call process is terminated. Also, in the aforementioned process of s100, if call mode is in absence mode (s100: YES), it is notified to the calling party that the call mode is switched to absence mode (s240). In this process, after the state in which the line between the telephone terminal 1 (the transmitter/receiver thereof) and the calling party is connected is made, the message (audio signals thereof) indicating that it is switched to absence mode is output to the calling party through the telephone line network 100. Meanwhile, the message has been previously recorded within the memory built in the control unit 10.

Then, it is determined whether or not the notification indicating that the call mode is switched to absence mode has been terminated (s250). In this process, if the message output to the telephone line network 100 has been terminated, it is determined that the notification has been terminated. If the message output has not been terminated, it is determined that the notification has not been terminated yet.

If the notification indicating that the call mode is switched to absence mode is terminated in the process of s250, (s250: YES), it is started to record the message (audio signals thereof) input by the calling party through the telephone line network 100 (s260). In this process, it is started to record the message input by the calling party through the telephone line network 100 within the memory built in the control unit 10, (that is, voice mail recording). In addition, counting by a timer is started in this process.

Then, it is determined whether or not the message input by the calling party has been terminated (s270). If the message input by the calling party has not been terminated in the process of s270 (s270: NO), it is determined whether or not a predetermined time period (according to the embodiment of the present invention, 20 seconds)has passed since recording of the message was started in the process of s260 (s280). If the predetermined time period has not passed (s280: NO), the procedure returns to the process of s270. In this process, it is determined whether or not the predetermined time period has passed by checking a counting value of the timer started in the process of s260.

Thus, if the message input by the calling party has been terminated in the process of s270 (s270: YES) or if the predetermined time period has passed in the process of s280 (s280: YES), recording of the message (audio signals thereof) input through the telephone line network 100 by the calling party is terminated (s290). In this process, recording of the message input by the calling party is terminated, while the line between the telephone terminal 1 (the terminal unit 10 thereof) and the calling party is set to be in a disconnected state. Also, the timer is stopped and reset in this process.

After the process of terminating the voice call is finished (s300), the procedure of the telephone call process is terminated. In this process, like in s230, the line between the telephone terminal 1 and the exchanger nearest to the calling party is set to be in a disconnected state. Also, if the notification indicating that the call mode has been switched to absence mode is not terminated in the process of s250 (s250: NO), it is determined whether or not the voice call has been terminated at the calling party (s310). In this process, the control unit 10 determines that the voice call has been terminated at the calling party, when the operation to terminate the voice call was conducted at the calling party (hereinafter referred to as on hook operation) and disconnected signal which is output from the exchanger nearest to the calling party is received.

If the voice call has not been terminated at the calling party (s310: NO) in the process of s310, the procedure returns to the process of s250. On the other hand, if the voice call has been terminated at the calling party (s310: YES), the procedure goes to the process of s300.

The Internet Call Process by the Control Unit 10

The procedure of the Internet call process executed by the control unit 10 will now be described with reference to the FIG. 4. The process of the Internet call process is performed when an incoming call is received from the Internet network 200.

First, it is checked which transmitter/receiver an incoming call received from the Internet network 200 is directed to (s410). The incoming call from the Internet network 200 is received on the basis of the IP address assigned to each transmitter/receiver; as a result, in this process, it is checked which IP address the incoming call is based on.

If the incoming call is a call for the handset 20 (IP address assigned to the handset 20) in the process of s410 (s420: YES), the individual Internet call process to the handset 20 is executed (s430). Individual Internet call process is a process to respond to an incoming call to the handset 20, and the specific processing procedure will be described in (Individual Internet call process by the control unit 10) (FIG. 5).

If the incoming call is a call for the first handset terminal 30a (IP address assigned to the handset 30a) in the process of s410 (s420; NO, s440: YES), individual Internet call process to the first handset terminal 30a is executed (s450). In this process, like in s430, the individual Internet call process is a process to correspond to an incoming call to the first handset terminal 30a, and specific processing procedure will be described in [Individual Internet call process by the control unit 10] (FIG. 5).

If the incoming call is a call for the second handset terminal 30b (IF address assigned to the handset 30b) in the process of s410 (s420: NO, s440: NO, s460: YES), the individual Internet call process to the second handset terminal 30b is executed (s470). In this process, like in s430 and s450, the individual Internet call process is a process to the second handset terminal 30b to respond to an incoming call, and specific processing procedure will be described in [Individual Internet call process by the control unit 10] (FIG. 5).

If the incoming call is a call for the third handset terminal 30c (IP address assigned to the handset 30c) in the process of s410 (s420: NO, s440: NO, s460: NO), individual Internet call process to the third handset terminal 30c is executed (s480). In this process, like in s430, s450 and s470, the individual Internet call process is a process to the third handset terminal 30c to respond to an incoming call, and specific processing procedure will be described in [Individual Internet call process by the control unit 10] (FIG. 5).

Thus, after performing the processes of s430, s450, s470 and s480, the Internet call process is terminated.

Individual Internet Call Process by the Control Unit 10

The procedure of the individual Internet call process executed by the control unit 10 will now be described with reference to the FIG. 5. The individual Internet call process is the detail of the process of s430, s450, s470 and s480 in FIG. 4.

First, it is checked the state of use of the transmitter/receiver received an incoming call from the Internet network 200 (s510). In this process, it is determined whether or not a voice call is in progress as the state of use of the transmitter/receiver received the incoming call, and whether or not a call mode is in absence mode. If the transmitter/receiver received the incoming call is the handset 20, it is determined whether or not the voice call using the handset 20 is in progress through the telephone line network 100 or the Internet network 200, while the call mode is checked by the state of switch by the mode switch of the operation panel 42. Also, if the transmitter/receiver received the incoming call is the handset terminal 30, the control IP packet so as to request for notifying the state of use is transmitted to the handset terminal 30. The handset terminal 30 received the IP packet transmits the control IP packet so as to indicate the state of use of the handset terminal 30 itself. The IP packet shows the state of use of the handset terminal 30; for example, if IP call mode is in absence mode, the IP packet indicates that it is in absence mode; if the voice call through the telephone line network 100 or through the Internet network 200 is in progress, the IP packet indicates that it is in progress; if the voice call is not in progress, the IP packet indicates that it is not in progress. And the state of use of the transmitter/receiver received the incoming call is checked by the IP packet.

If the state of use checked in the process of s510 indicates that the voice call is not in progress (s520: NO), it is determined whether or not call mode (or IP call mode) is in absence mode (s530). If the call mode is not in absence mode in the process of s530 (s530: NO), calling to the transmitter/receiver is started (s540). In this process, if the transmitter/receiver received the incoming call is the handset 20, the control unit 10 commands the user I/F 40 to start outputting a ringing tone, the user I/F 40 received the command starts outputting the ringing tone from the speaker unit 46. Alternatively, if the transmitter/receiver received the incoming call is the handset terminal 30, the control unit 10 transmits the control IP packet so as to command to start outputting a ringing tone to the handset terminal 30, and thereby the handset terminal 30 received the IP packet starts outputting the ringing tone from the speaker unit 38.

After the process of s540 is finished, it is determined whether or not the transmitter/receiver has responded to the calling (s550). In this process, it is determined whether or not off hook operation has been performed. In the process of s550, if the transmitter/receiver has not respond to the calling (s550: NO) but the incoming call has continued (s560: YES), the procedure returns to s550. If the incoming call has not continued (s560: NO), calling started in the process of s540 is terminated (s570). In this process, if the transmitter/receiver started the calling in the process of s540 is the user I/F 40, the control unit 10 commands the user I/F 40 to terminate output of a ringing tone; as a result, the user I/F 40 received the command terminates output of the ringing tone. Alternatively, if the transmitter/receiver started the calling in the process of s540 is the handset terminal 30, the control unit 10 transmits the control IP packet so as to command to terminate output of a ringing tone to the handset terminal 30; as a result, the handset terminal 30 received the IP packet terminates output of the ringing tone.

After the process of s570 is finished, the individual Internet call process is terminated. Also, if the transmitter/receiver responds to the calling in the process of s550 (s550: YES), the calling started in the process of s540 is terminated (s680). This process is the same as the process of s570.

Then, the voice call between the transmitter/receiver responded to the calling in the process of s550 and the calling party, is started (S590). In this process, like in s210 in FIG. 3, the voice call is started by making the line between the telephone terminal 1 (the transmitter/receiver thereof) and the calling party in a connected state.

Then, the control unit 10 waits until the voice call is no longer continued (s600: NO). In this process, like in s220 in FIG. 3, the control unit 10 waits until off hook operation is performed. If the voice call is no longer continued in the process of s600 (s600: YES), call end process is executed (s610). In this process, like in s230 and s310 in FIG. 3, the voice call is terminated by making the line between the telephone terminal 1 (the transmitter/receiver thereof) and the calling party in a disconnected state.

After the process of s610 is finished, the individual Internet call process is terminated. Alternatively, if the state of use checked in the process of s510 indicates that the voice call is in progress (s520: YES), it is notified to the calling party that the voice call is in progress (s620). In this process, the message (the voice call thereof) so as to notify that the voice call is in progress is output to the calling party. Meanwhile, the message has been previously recorded within the memory built in the control unit 10.

Alternatively, if the call mode (or the IP call mode) is in absence mode in the process of s530 (s530: YES), it is notified to the calling party that the call mode is switched to absence mode (s630). In this process, like in s240 in FIG. 3, the message indicating that it is switched to absence mode is output to the calling party.

Thus, after the process of s630 or s620 is finished, it is determined whether or not the notification (by the process of s620 or s630) has been terminated (s640). In this process, like in s250 in FIG. 3, if the message output has been terminated, it is determined that the notification has been terminated. If the message output has not been terminated, it is determined that the notification has not been terminated.

If the notification has been terminated in the process of s640 (s640: YES), it is started to record the message (audio signals thereof) input through the telephone line network 100 by the calling party (s650). In this process, like in s260 in FIG. 3, recording of the message input by the calling party as well as counting by a timer is started.

Then, it is determined whether or not the message input by the calling party has been terminated (s660). If the message input by the calling party has not been terminated in the process of s660 (s660: NO), it is determined whether a predetermined time period has passed since the message recording was started in the process of s650 (according to the embodiment of the present invention, 20 seconds) (s670). If the predetermined time period has not passed (s670: NO), the procedure returns to the process of s660. In this process, like in s280 in FIG. 3, it is determined whether or not the predetermined time period has passed by checking the counting value of the timer.

Thus, if the message input by the calling party has been terminated in the process of s660 (s660: YES) or if the predetermined time period has passed in the process of s670 (s670: YES), the message recording (audio signals thereof) input through the telephone line network 100 by the calling party is terminated (s680). In this process, like in s290 in FIG. 3, the message recording is terminated; the line between the telephone terminal 1 and the calling party is set to be in a disconnected state; the timer is stopped and reset.

Then, after performing the end process (s690), the telephone call process is terminated. In this process, like in s300 in FIG. 3, the line between the telephone terminal 1 and the exchanger nearest to the calling party is set to be in a disconnected state. Also, if the notification has not been terminated in the process of s640 (s640: NO), it is determined whether or not the voice call has been terminated at the calling party (s700). In this process, like in s300 in FIG. 3, it is determined that the voice call has been terminated if disconnected signal has been input.

If the voice call has not been terminated at the calling party in the process of s700 (s700: NO), the procedure returns to the process of s640. On the other hand, if the voice call has been terminated at the calling party in the process of s700, the procedure goes to the process of s690.

Advantages

According to the telephone terminal 1 configured as above, when an incoming call based on IP address is received through the Internet network 200 (FIG. 4), it is determined whether or not a voice call through the transmitter/receiver assigned to the IP address is available in the process of s520, s530 in FIG. 5. If the determination result reveals that the voice call through the transmitter/receiver is available, in short, if the call mode is in normal mode instead that the voice call is in progress, the transmitter/receiver is called and the voice call with the calling party through the Internet network 200 is performed in the process after s540. On the other hand, if the determination result reveals that the voice call is unavailable, in short, if the voice call is in progress or the call mode is in absence mode, the message indicating that the voice call is unavailable is output to the calling party in the process of s620 and s630. Thus, when an incoming call is received through the Internet network 200, a voice call to the incoming call can be performed between the transmitter/receiver received the incoming call and the calling party without fail.

Alternatively, when an incoming call based on IP address is received through the Internet network 200, it is determined whether or not the transmitter/receiver of the IP address is in the state in which a voice call is available in the process of s520 and s530 in FIG. 56 According to the determination result, only if the voice call is available, the transmitter/receiver is called in the process of s540.

Moreover, if the voice call is disabled in the process of s520 and s530, it is possible to notify to the user of the calling party that the voice call is disabled (the voice call is in progress or the call mode is in absence mode) by the message outputting to the calling party in the process of s630.

When receiving the control IP packet transmitted from the base unit of the telephone terminal 1 in the process of s510 in FIG. 5, each handset terminal 30 notifies that which mode the IP call mode is in, and that the voice call is/is not in progress if the voice call using the handset terminal 30 itself is/is not in progress through the telephone line network 100 or the Internet network 200, respectively, by the function of the control unit 32. In addition, the control unit 10 of the base unit of the telephone terminal 1 determines in the process of s520 and s530 that the voice call using the handset terminal 30 is disabled when the handset terminal 30 notifies that the IP call mode is in absence mode or that the voice call is in progress, while determines that the voice call using the handset terminal 30 is enabled when the handset terminal 30 notifies that the IP call mode is neither absence mode nor in progress. Thus, the control unit 10 determines whether or not the voice call is available based on whether or not the voice call using the handset terminal 30 is in progress and on the IP call mode.

Alternatively, when receiving the control IP packet transmitted from the base unit of the telephone terminal 1 in the process of s610 in FIG. 5, the handset terminal 30 notifies whether the IP call mode is in normal mode or in absence mode in accordance with the state of the mode switch. Therefore, the control unit 10 of the telephone terminal 1 determines whether or not the voice call is enabled in accordance with the state of the mode switch (the state of setting) in the handset terminal 30.

After the notification is conducted in the processes of s620 and s630 in FIG. 5, the message (audio signals thereof) input by the calling party is recorded within the memory built-in the control unit 10 during the processes between s650 and s680. Thus, when a voice call through a transmitter/receiver unit is disabled, answering phone function is performed by recording the message input by the calling party by using the memory built-in the control unit 10.

Modification of the Embodiment

Although the present invention has been described in connection with the above embodiment, the present invention is not limited to the embodiment but may have a various forms. For example, while the configuration of the telephone terminal of the present invention is applied to the telephone terminal 1 in the above embodiment, the configuration of the telephone terminal of the present invention may be applied to any apparatus other than the telephone terminal 1 as long as the apparatus has the function to enable a voice call through the Internet network 200.

Figure 3:
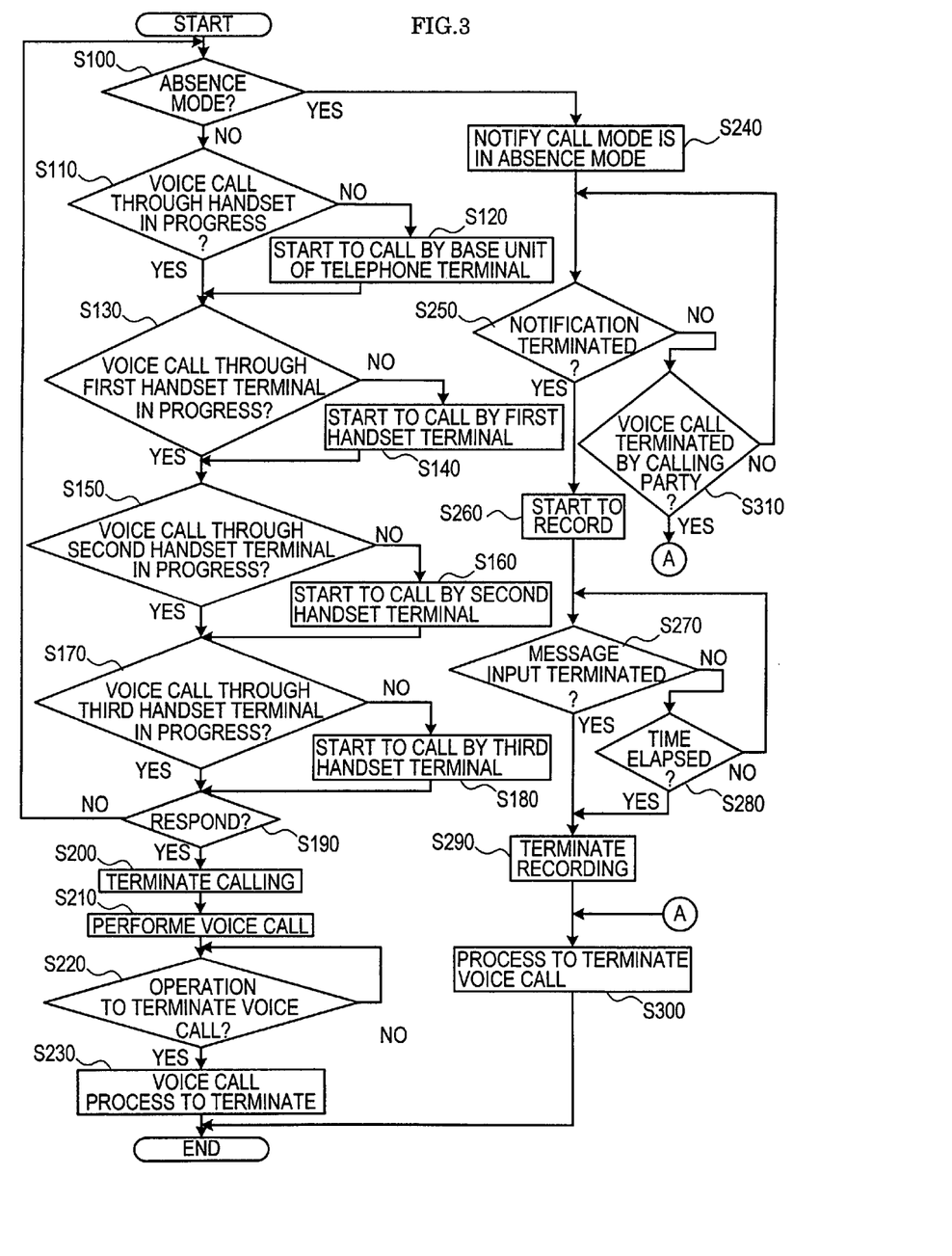
FIG. 3 is a flowchart showing a processing procedure of an telephone call process.
Figure 4:
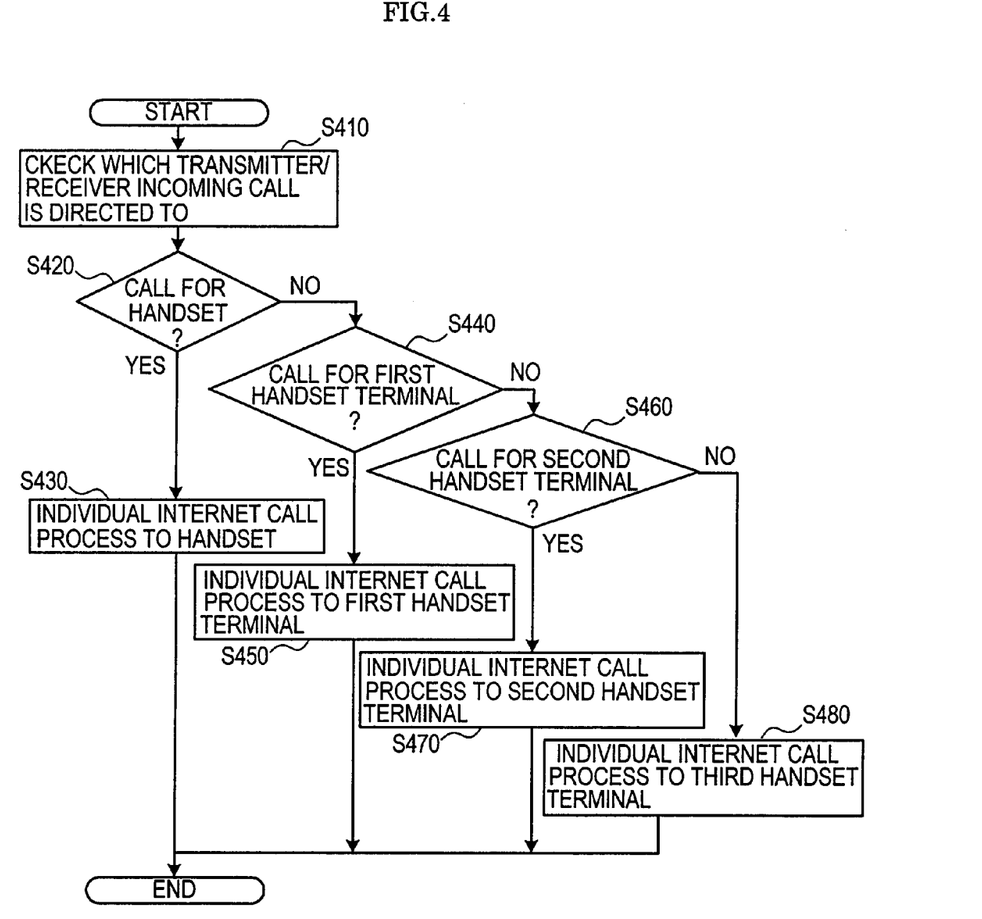
FIG. 4 is a flowchart showing a processing procedure of an Internet call process.
Figure 5:
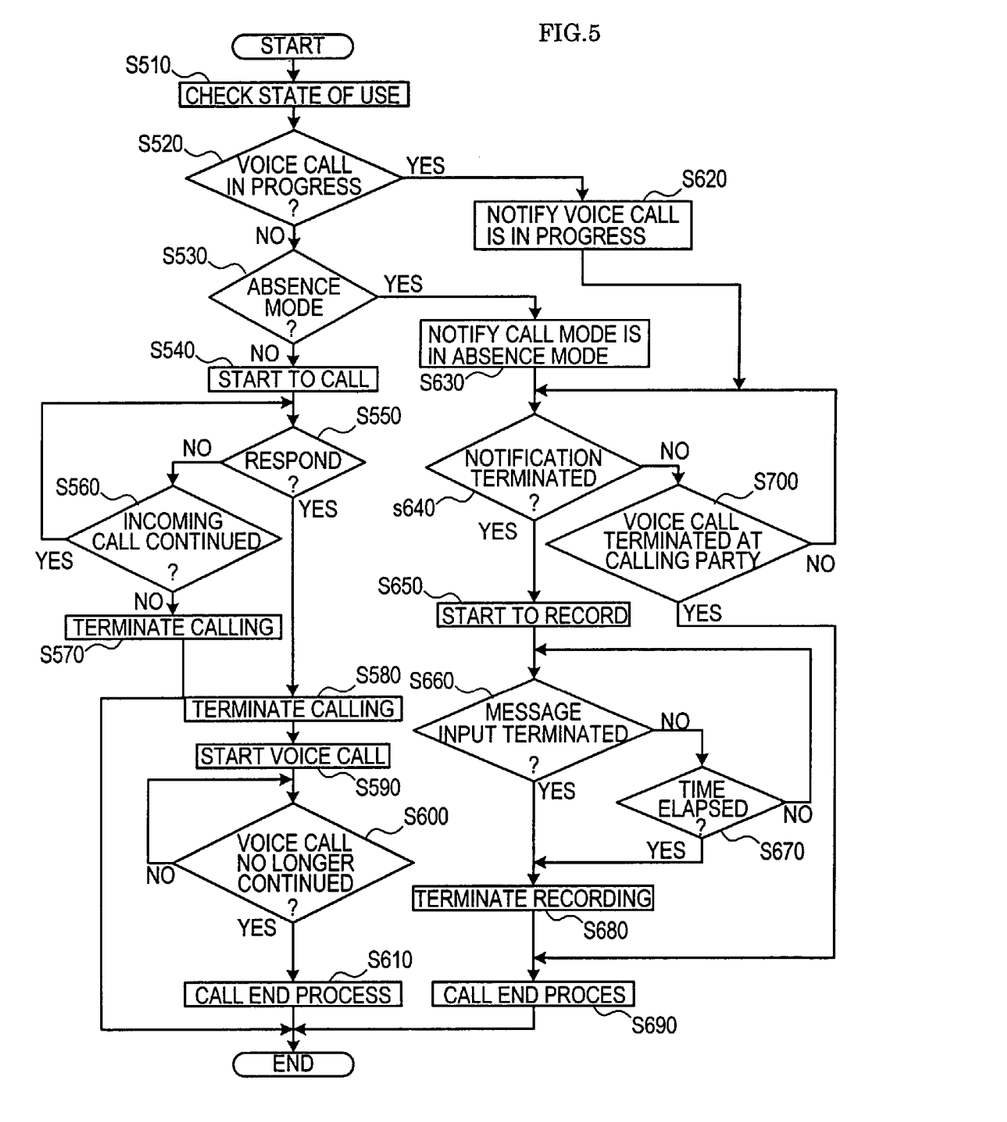
FIG. 5 is a flowchart showing a processing procedure of an individual Internet call process.

In the above described embodiment, each of the processes shown in FIG. 3, FIG. 4 and FIG. 5 is executed by a computer system comprising the control unit 10 of the telephone terminal 1. However, one or more of these processes may be executed by another computer system connected to the telephone terminal 1 through a cable or wireless signal transmission path.

In the above described embodiment, each of the processes shown in FIG. 3, FIG. 4 and FIG. 5 is executed in accordance with the processing procedure recorded in the memory built-in the telephone terminal 1. However, if the telephone terminal 1 can input/output data among recording medium such as FD and memory card, each of the above processes may be executed on the basis of the recording medium recorded the aforementioned processing procedure.

In the above described embodiment, in the processes after s260 in FIG. 3 and after s650 in FIG. 5, the message input by the calling party is recorded in the memory built-in the control unit 10. However, data table may be recorded in the recording medium as long as the telephone terminal 1 can record and read data in any recording medium (for example, hard disk and memory card) other than the memory built-in the control unit 10.

In the above described embodiment, the IP address is assigned to each transmitter/receiver as URI: Uniform Resource Identifiers over Internet. However, any URI (for example, URL, mail address and telephone number) other than IP address may be assigned to these transmitter/receivers.

In the above described embodiment, a call mode is switched in hard ware by the mode switches of the operation panel 42 and 34. However, call mode may be set in soft ware. More specifically, flag indicating call mode may be set in the memories built-in the control unit 10 and 32; the value of the flag may be placed in either 0 (normal mode) or 1 (absence mode) in accordance with the operation of the operation panel 42 and 34. Then, when the control unit 10 of the base unit of the telephone terminal 1 in the process of s100 in FIG. 3 or the control unit 32 of the handset terminal 30 in the process of s510 in FIG. 5 receives the control IP packet, it may be determined which mode the call mode is in based on the value set in the aforementioned flag.

In the above described embodiment, the IP address is assigned to each transmitter/receiver as URI: Uniform Resource Identifiers over Internet. However, any URI other than IP address (for example, URL, mail address and telephone number) may be assigned to these transmitter/receivers.

In the above described embodiment, the message, which has been previously recorded in the memory built-in the control unit 10, is output to a calling party in the process of s620 and s630 in FIG. 5. However, for example, the message outputting to the calling party in this process may be recorded in the memory built-in the control unit 32 constituted the handset terminal 30. And when the control IP packet transmitted from the base unit of the telephone terminal 1 is received in the process of s510, the IP packet as well as the control IP packet to indicate the state of use of the handset terminal 30 itself is generated from the message indicating either the voice call is in progress or IP call mode is in absence mode, thereby transmitting the IP packet to the base unit of the telephone terminal 1.

Figure 6:
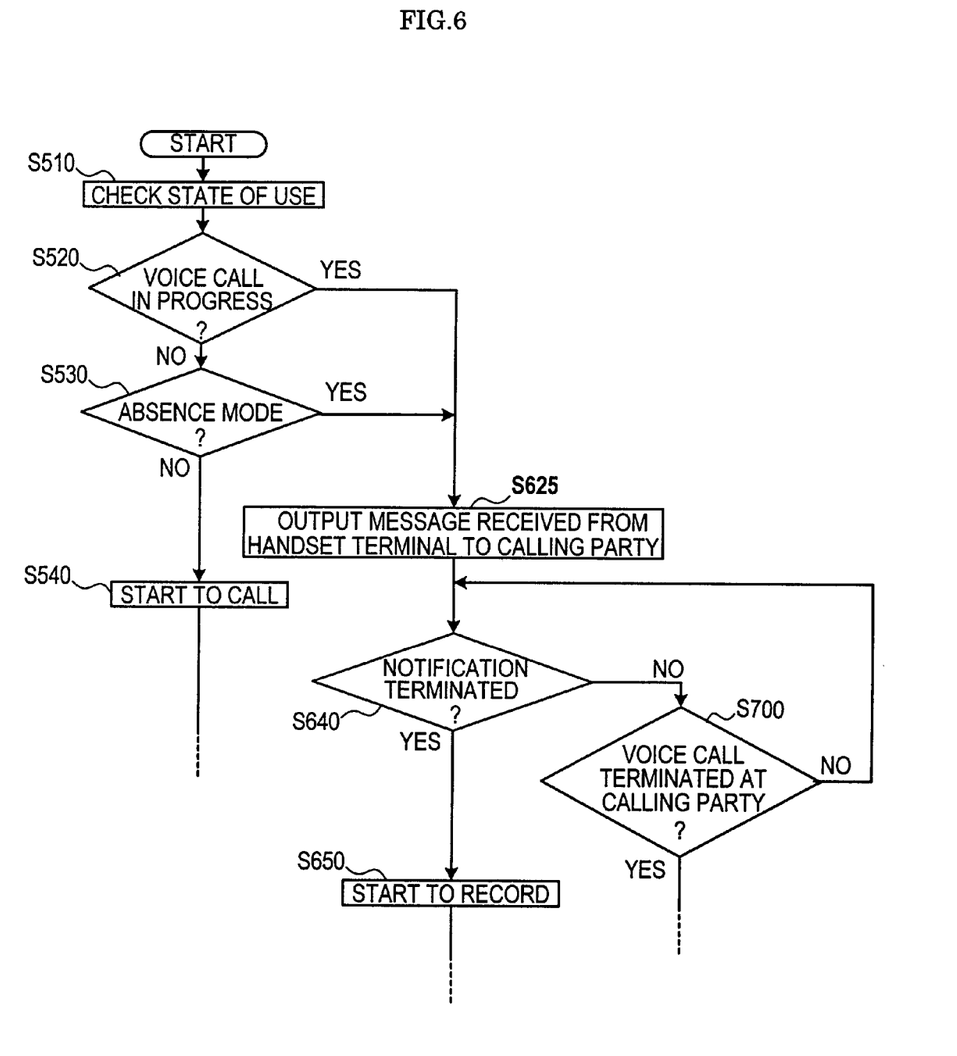
FIG. 6 is a flowchart showing a processing procedure of an individual Internet call process according to another embodiment.

In this case, as shown in FIG. 6, after the process of 510 in FIG. 5 is finished, the control unit 10 may be configured such that when the voice call is in progress or IP call mode is in absence mode, the message received from the handset terminal 30 as well as the notification is output to the calling party. Consequently, the procedure goes to the process of s640 after s625.

If configured as above, the handset terminal 30 notifies and transmits the message indicating that the voice call is in progress if the voice call through the handset terminal 30 itself is in progress to the base unit of the telephone terminal 1 by the function of the control unit 32. Also, if being switched to the absence mode, the handset terminal 30 notifies and transmits the message indicating that call mode is in absence mode to the base unit of the telephone terminal 1. The base unit of the telephone terminal 1 outputs the message received from the handset terminal 30 as the message indicating that the voice call is in progress or that IP call mode is in absence mode to the calling party in the processes of s620 and s630 in FIG. 5. In this configuration, a different message is given to each handset terminal 30 (recorded in the memory built-in the control unit 32), with a result that a different message for every handset terminal 30 is output to the calling party as the message so as to notify that the voice call is in progress or the IP call mode is in absence mode.

In the above described embodiment, each handset terminal 30 is configured such that the call mode is switched by the mode switch of the operation panel 34. However, the call mode of each handset terminal 30 may be switched by the operation panel 42 of the base unit of the telephone terminal 1.

If configured as above, when the incoming call based on the IP address is received through the Internet network 200, the call mode of the handset terminal 30, to which IP address is assigned, is checked at the side of the base unit of the telephone terminal 1 instead of being notified by the handset terminal 30. More specifically, in this configuration, the call mode of each handset terminal 30 can be changed collectively by the operation panel 34 of the base unit of the telephone terminal 1.

The control unit 10 is configured such that the state of use of the handset terminal 30 is checked based on the control IP packet transmitted from the handset terminal 30 in the process of s510 in FIG. 5. However, if the handset terminal 30 can not respond to an inquiry because (i) the handset terminal 30 breaks down, (ii) a remaining battery capacity for driving the handset terminal 30 decreased, or (iii) the receiving level of an electric wave transmitted from the handset terminal 30 is below a threshold when using wireless communication (that is, outside the service area), there is a possibility that the control IP packet may not be performed normally. Therefore, the control unit 10 may be configured to perform the process shown in FIG. 7 in the processes after s510.

Figure 7:
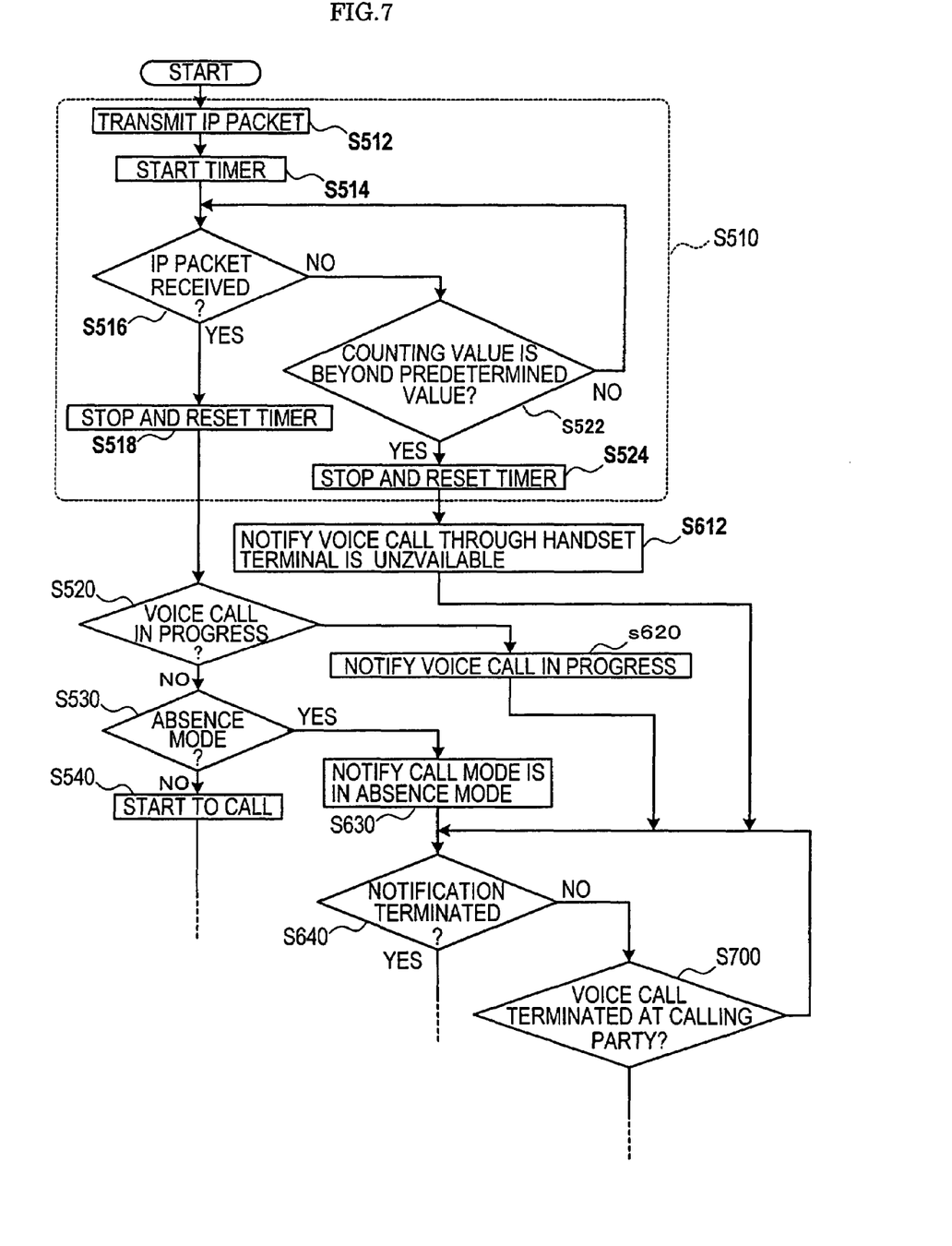
FIG. 7 is a flowchart showing a processing procedure of an individual Internet call process according to another embodiment.

When transmitting the control IP packet to the handset terminal 30 (s512) in the process of s510 the control unit 10 starts a timer (s514) and determines whether or not the control IP packet is received from the handset terminal 30 (s516). If the control IP packet is received (s516: YES), the timer is stopped and reset (s518), then the procedure goes to the process of s520 Alternatively, unless the control IP packet is received (s516: NO) and if the counting value of the timer is below the predetermined value (s522: NO), the procedure returns to the process of s514. If the counting value of the timer is beyond the predetermined value (s522: YES), the timer is stopped and reset (s524), then it is notified that the voice call through the handset terminal 30 is unavailable (s612) and the procedure goes to the process of s640. In the process of s612, the message (audio signals thereof) indicating that the voice call through the handset terminal 30 is unavailable is output to the calling party. Meantime, the message has been previously recorded in the memory built-in the control unit 10.

If configured as above, when the handset terminal 30 can not respond to an inquiry because (i) the handset terminal 30 breaks down, (ii) a remaining battery capacity for driving the handset terminal 30 decreases, or (iii) the receiving level of an electric wave transmitted by the handset terminal 30 is below a threshold when using wireless communication (that is, outside the service area), it is determined that the handset terminal 30 is disabled in the process of s514. And the message indicating the voice call through the handset terminal 30 is disabled is notified to the calling party.

What is claimed is:

1. A telephone terminal having a plurality of transmitter/receiver units, to each of which identifying information on Internet is assigned, and a base unit for inputting/outputting audio signals transmitted through Internet to relay the audio signals to the transmitter/receiver unit, wherein the base unit comprises:

an inquiry device that inquires a state of use to the transmitter/receiver unit, to which the identifying information is assigned, when an incoming call based on the identifying information is received through Internet;

a determination device that determines whether a voice call through the transmitter/receiver unit is available based on the state of use responded to the inquiry by the inquiry device;

and a call response device (i) that calls the transmitter/receiver unit to perform a voice call with a calling party through Internet, when the determination device determines that the voice call through the transmitter/receiver unit is available, (ii) that outputs the message to the calling party so as to notify that the voice call is unavailable, when the determination device determines the voice call is unavailable; and wherein the transmitter/receiver unit comprises:

a notification device that notifies the state of use of the transmitter/receiver unit to the base unit when receiving the inquiry of the state of use from the base unit.

2. The telephone terminal as set forth in claim 1, wherein the transmitter/receiver unit notifies by the notification device that the voice call through the transmitter/receiver unit is in progress when the voice call is in progress through Internet, while notifies that the voice call through the transmitter/receiver unit is not in progress when the voice call is not in progress, when receiving the inquiry of the state of use from the base unit, wherein the base unit determines by the determination device that the voice call through the transmitter/receiver unit is unavailable when the transmitter/receiver unit notifies that the voice call is in progress, while determines that the voice call is available when the transmitter/receiver notifies that the voice call is not in progress.

3. The telephone terminal as set forth in claim 1, wherein the transmitter/receiver unit includes a setting device that the transmitter/receiver unit can set the state capable or incapable of response to an incoming call according to a user's operation, and notifies by the notification device that the transmitter/receiver unit is incapable of response if being set in the state incapable of response by the setting device, while notifies that the transmitter/receiver unit is capable of response if being set in the state capable of response by the setting device when receiving the inquiry of the state of use from the base unit, and wherein the base unit determines by the determination device that the voice call through the transmitter/receiver unit is unavailable if being notified that the transmitter/receiver unit is incapable of response, while determines that the voice call through the transmitter/receiver unit is available if being notified that the transmitter/receiver unit is capable of response.

4. The telephone terminals as set forth in claim 3, wherein the transmitter/receiver unit notifies when receiving the inquiry of the state of use from the base unit that the transmitter/receiver unit is capable of response if being set in the state incapable of response by the setting device, and outputs the message so as to notify that the transmitter/receiver unit is incapable of response, and wherein if being determined to be incapable of response by the determination device, the base unit outputs the notification indicating that the transmitter/receiver unit is incapable of response and the message input by the transmitter/receiver as a message so as to notify that the voice call is unavailable to the calling party by the call response device.

5. The telephone terminal as set forth in claim 1, wherein the base unit comprises a setting device for placing individually whether or not each of a plurality of the transmitter/receiver units is capable of response to an incoming call according to a user's operation, and wherein the determination device determines when receiving the incoming call based on the identifying information through Internet that voice call is unavailable if the transmitter/receiver unit, to which the identifying information is assigned, is set to be incapable of response, while determines that voice call is available if the transmitter/receiver unit is set to be capable of response.

6. The telephone terminal as set forth in claim 1, wherein the base unit includes a voice recording device capable of recording audio signals, and a recording command device to make the voice recording device record audio signals input by the calling party after the call response device outputs the message to the calling party.

7. The telephone terminal as set forth in claim 1, wherein when not receiving a response to the inquiry by the inquiry device, the base unit determines by the determination device that the voice call through the transmitter/receiver is unavailable.

8. A telephone terminal having a plurality of transmitter/receiver units, to each of which identifying information on the Internet is assigned, and a base unit for inputting/outputting audio signals transmitted through Internet to relay the audio signals to the transmitter/receiver unit, wherein the base unit comprises:

an inquiry device that inquires a state of use to the transmitter/receiver unit, to which the identifying information is assigned, when an incoming call based on the identifying information is received through Internet;

a determination device that determines whether a voice call through the transmitter/receiver unit is available based on the state of use responded to the inquiry by the inquiry device; and a call response device (i) that calls the transmitter/receiver unit to perform a voice call with a calling party through Internet, if the determination device determines that the voice call through the transmitter/receiver unit is available, (ii) that outputs the message to the calling party so as to notify that the voice call is unavailable, if the determination device determines the voice call is unavailable; and wherein the transmitter/receiver unit comprises:

a notification device that notifies the state of use of the transmitter/receiver unit to the base unit when receiving the inquiry of the state of use from the base unit.

9. A computer-readable storage medium having recorded thereon a terminal control program for causing a computer to execute a variety of processes for controlling a telephone terminal comprising a plurality of transmitter/receiver units, to each of which identifying information on Internet is assigned, and a base unit for inputting/outputting audio signals transmitted through Internet to relay the audio signals to the transmitter/receiver unit, the terminal control program including:

a determination process to determine whether a voice call through the transmitter/receiver is available based on a state of use of the transmitter/receiver unit, to which the identifying information is assigned; and a call response process (i) to call the transmitter/receiver unit to perform a voice call with a calling party through Internet when the determination process determines that the voice cell through the transmitter/receiver unit is available, (ii) to output the message so as to notify that the voice call is unavailable to the calling party when the determination process determines that the voice cell through the transmitter/receiver unit is unavailable.

10. A computer-readable storage medium having recorded thereon a terminal control program for causing a computer to execute a variety of processes for controlling a telephone terminal comprising a plurality of transmitter/receiver units, to each of which identifying information on Internet is assigned, and a base unit for inputting/outputting audio signals transmitted through Internet to relay the audio signals to the transmitter/receiver unit, the terminal control program including:

a determination process to determine whether a voice call through the transmitter/receiver unit is available based on a state of use of the transmitter/receiver unit, to which the identifying information is assigned; and a call response process (i) to call the transmitter/receiver unit to perform a voice call with a calling party through Internet when the determination process determines that the voice call through the transmitter/receiver unit is available, (ii) to output the message so as to notify that the voice call is unavailable to the calling party when the determination process determines that the voice call through the transmitter/receiver unit is unavailable.

11. A communication method using a telephone terminal having a plurality of transmitter/receiver units, to each of which identifying information on Internet is assigned, and a base unit for inputting/outputting audio signals transmitted through Internet to relay the audio signals to the transmitter/receiver unit, comprising the steps of:

inquiring a state of use to the transmitter/receiver unit, to which the identifying information is assigned, when an incoming call based on the identifying information is received through Internet;

determining whether a voice call through the transmitter/receiver unit is available based on the state of use responded to the inquiry; and (i) calling the transmitter/receiver unit to perform a voice call with a calling party through Internet, when the determination device determines that the voice call through the transmitter/receiver unit is available, (ii) outputting the message to the calling party so as to notify that the voice call is unavailable, when the determination device determines the voice call is unavailable.

* * * * *